United States Patent
Shimoyama

(10) Patent No.: US 7,644,208 B2
(45) Date of Patent: Jan. 5, 2010

(54) SERIAL TRANSMISSION SYSTEM WITH A RETURN SIGNAL GENERATOR FROM THE FARTHEST TERMINAL TO SYNCHRONIZE RETURN SIGNALS/DATA FROM THE FARTHEST TERMINAL WITH ANY SPECIFIED INTERVENING TERMINALS

(75) Inventor: Satoshi Shimoyama, Tokyo (JP)

(73) Assignee: Advantest Corporation, Tokyo (JP)

( * ) Notice: Subject to any disclaimer, the term of this patent is extended or adjusted under 35 U.S.C. 154(b) by 523 days.

(21) Appl. No.: 11/631,220

(22) PCT Filed: Jul. 6, 2005

(86) PCT No.: PCT/JP2005/012511

§ 371 (c)(1),
(2), (4) Date: Dec. 28, 2006

(87) PCT Pub. No.: WO2006/004163

PCT Pub. Date: Jan. 12, 2006

(65) Prior Publication Data

US 2008/0294812 A1    Nov. 27, 2008

(30) Foreign Application Priority Data

Jul. 6, 2004    (JP)    ............................... 2004-199669

(51) Int. Cl.
*G06F 3/00* (2006.01)
*H04J 3/07* (2006.01)

(52) U.S. Cl. ........................................ 710/61; 370/503
(58) Field of Classification Search .................... 710/61
See application file for complete search history.

(56) References Cited

U.S. PATENT DOCUMENTS

| 4,884,269 | A   | * | 11/1989 | Duncanson et al. | ......... 370/251 |
| 6,532,243 | B1 | * | 3/2003  | Leijonhufvud     | ............. 370/503 |
| 6,885,661 | B1 | * | 4/2005  | Hopper et al.    | ............. 370/354 |
| 7,230,974 | B1 | * | 6/2007  | Lu et al.        | ..................... 375/145 |

FOREIGN PATENT DOCUMENTS

| JP | 05-308358 | 11/1993 |
| JP | 07-023017 | 1/1995  |
| JP | 07-250069 | 9/1995  |

* cited by examiner

*Primary Examiner*—Henry W. H. Tsai
*Assistant Examiner*—Hyun Nam
(74) *Attorney, Agent, or Firm*—David N. Lathrop

(57) ABSTRACT

A terminal of a plurality of terminals that is located at the farthest position from a host has a return signal generator section, the return signal generator section transmits a return signal at a timing when data transmitted from the host to the terminals arrives at the terminal located at the farthest position, the return signal is returned to the host successively passing through interfaces of the terminals connected to a data bus, and each terminal originates data to be transmitted from the terminal to the host or from the terminal to a particular another terminal in synchronization with the return signal and delivers the data from the terminals to the host or the terminal in synchronization with the return signal.

5 Claims, 11 Drawing Sheets

SERIAL TRANSMISSION SYSTEM WITH A RETURN SIGNAL GENERATOR FROM THE FARTHEST TERMINAL TO SYNCHRONIZE RETURN SIGNALS/DATA FROM THE FARTHEST TERMINAL WITH ANY SPECIFIED INTERVENING TERMINALS

TECHNICAL FIELD

The present invention relates to a data transmission method and a data transmission system that can be suitably applied to an apparatus composed of a plurality of units interconnected via a data bus line to serve a common purpose, such as an IC testing apparatus.

BACKGROUND ART

FIG. 11 is a schematic diagram showing a data transmission path of an IC testing apparatus conventionally used. In this drawing, reference numeral 1 denotes a host computer, reference numeral 1A denotes a data transmitter section in the host computer 1, and reference numeral 1B denotes a data receiver section. Reference numerals 2-1, 2-2, 2-$n$ each denote a terminal that operates under instructions from the host computer 1. In this example of the IC testing apparatus, the terminal 2-1 may serve as a pattern generator section, the terminal 2-2 may serve as a timing generator section, and the terminal 2-$n$ may serve as a test head, for example.

Each terminal 2-1, 2-2, ..., 2-$n$ has an input/output interface 3, and the interfaces 3 are connected in series to an outgoing data bus line 4. Data addressed to each terminal 2-1, 2-2, ..., 2-$n$ transmitted over the outgoing data bus line 4 is taken in by the terminal through the interface 3.

Data to be delivered from each terminal 2-1, 2-2, ..., 2-$n$ to the host computer 1 is output to the outgoing data bus line 4 from the interface 3. The data is transmitted through an incoming data bus line 5 and received by the data receiver section 1B of the host computer 1 and thus taken in by the host computer 1.

DISCLOSURE OF THE INVENTION

Issues to be Solved by the Invention

As described above, according to the prior art, the outgoing data bus line 4 and the incoming data bus line 5 are provided between the host computer 1 and the terminals to form a transmission path loop interconnecting the host computer 1 and the terminals 2-1, 2-2, ..., 2-$n$ for data transmission/reception. Therefore, there is a disadvantage that the amount of the data bus lines provided is doubled, and a thick cable is required if the outgoing data bus line 4 and the incoming data bus line 5 are tied together.

In addition, there is another disadvantage that cable replacement is required for adding a terminal, so that it is troublesome to add a terminal.

An object of the present invention is to provide a data transmission method that can halve the amount of cables provided and allows easy addition of a new terminal, and a data transmission system that implements the data transmission method.

Means to Solve the Issues

According to the present invention, in a data transmission method in a serial transmission system in which interfaces of a plurality of terminals are connected in series to a data bus line connected to a host, a terminal of the plurality of terminals which is located at the farthest position from the host has a return signal generator section, and data passed from the host to each terminal, from each terminal to the host or between terminals is transmitted through the interfaces, the return signal generator section transmits a return signal at a timing when data transmitted from the host to the terminals arrives at the terminal located at the farthest position, the return signal is returned to the host passing successively through the interfaces of the terminals connected to the data bus, and each terminal originates data to be transmitted to the host in synchronization with the return signal and transmits the data to the host in synchronization with the return signal.

EFFECTS OF THE INVENTION

According to the present invention, only the return signal generator section provided in the terminal located connected to the data bus line at the distal end thereof is controlled to be kept in the enabled state and originates the return signal at the time when a signal from the host arrives at the terminal located at the distal end. The return signal is returned to the host via the same data bus line. Any terminal to transmit data to the host transmits the data in synchronization with the return signal passing through the interface thereof. The host can read the data if arrival of the return signal is detected. A bit position is assigned to the data transmitted from each terminal. Thus, from the bit position of the data read by the host, the host can recognize which terminal has transmitted the data.

Thus, a single data bus line can be used for bidirectional transmission, and the amount of cables used as the data bus line can be reduced to a half. In addition, the cables can be thinner, so that the cables can be installed more easily. Furthermore, a new terminal can be advantageously easily added.

A data transmission system according to the present invention can be applied to fields of measurement equipment and control equipment that involve data transmission between multiple terminals.

BEST MODES FOR CARRYING OUT THE INVENTION

A data transmission method and a data transmission system according to the present invention can be suitably applied to an IC testing apparatus, for example. The host computer of the IC testing apparatus corresponds to the host 1 described above, terminals that operate under the control of the host computer including a timing generator, a pattern generator, a waveform shaping unit, a logic comparator are connected to a data bus in a cascade manner, and a test head is connected to the data bus line at the distal end thereof.

Thus, according to the present invention, for example, a return signal generator section provided in the test head is set in an enabled state, the return signal generator section in the test head originates a return signal at the time when a control signal transmitted from the host computer arrives at the test head, and the return signal is transmitted to the host computer through the interfaces of the terminals.

Each terminal can transmit data to be transmitted from the terminal to the host computer or another terminal in synchronization with the return signal when the return signal passes through the interface thereof.

A bit position is assigned to the data transmitted from each terminal. Thus, the host computer or the other terminal that receives data transmitted from each terminal can recognize which terminal has transmitted the data based on the bit position of the data. In addition, the host computer or each terminal can start receiving the incoming data in synchronization with the arrival of the return signal transmitted from the terminal located at the distal end. Even if a delay occurs on the data bus, the return signal and the data are equally delayed, so that there is no possibility that the data cannot be read.

First Embodiment

Figure 1:
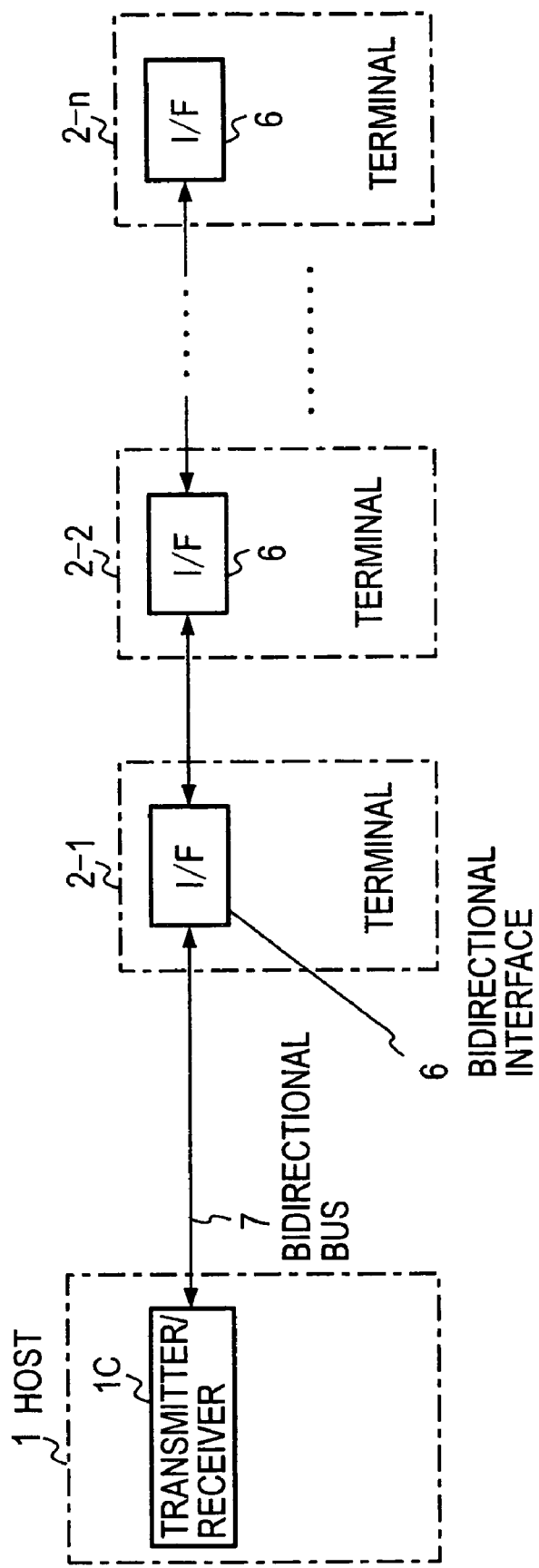
FIG. 1 is a block diagram for illustrating a data transmission method according to the present invention.
Figure 11:
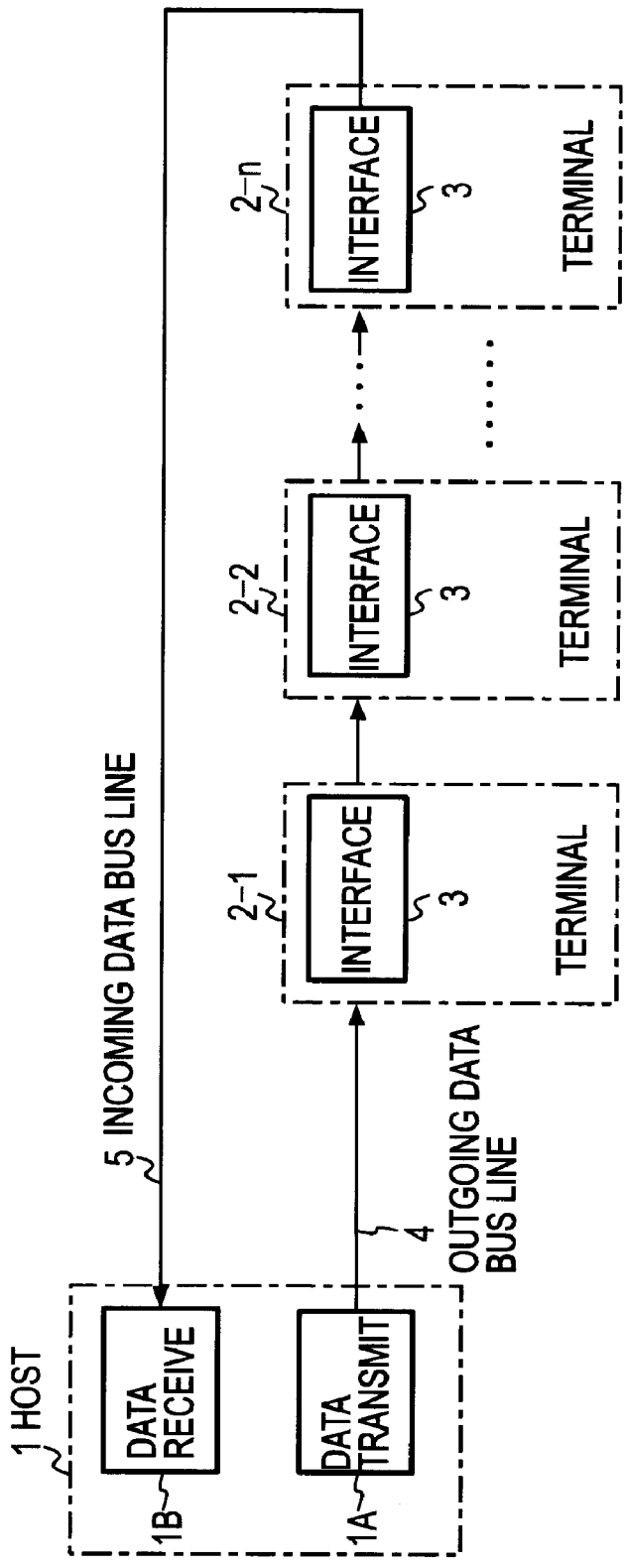
FIG. 11 is a block diagram for illustrating a prior art.

FIG. 1 is a schematic block diagram for illustrating a data transmission method according to the present invention, in which parts corresponding to those shown in FIG. 11 are denoted by the same reference numerals as in FIG. 11. A host 1 and terminals 2-1, 2-2, ..., **2-*n* are the same as those in FIG. 11. However, according to the present invention, the host 1 and the n terminals 2-1, 2-2, ..., 2-*n* are cascaded to each other via a bidirectional bus 7, and each terminal 2-1, 2-2, ..., 2-*n* has a bidirectional interface 6. Therefore, the host 1** has a transmitter/receiver IC as means for transmitting and receiving data.

The host 1 transmits a parallel n-bit command word (simply referred to also as command hereinafter) and a parallel n-bit data word (simply referred to also as data hereinafter) to the terminals 2-1, 2-2, ..., **2-*n* (this direction of transmission will be referred to as downward direction hereinafter). Each terminal 2-1, 2-2, ..., 2-*n* takes in data addressed thereto from among the data transmitted from the host 1**. In this step, it is possible to determine to which terminal each piece of data is addressed based on an address code indicating the destination of the data added to each command or the bit position in the n-bit word data assigned to each terminal.

When the data transmitted from the host 1 arrives at the terminal **2-*n* located at the distal end of the bidirectional bus, the terminal 2-*n* transmits a return signal. The return signal is transmitted through the bidirectional bus 7 in the opposite direction (referred to as upward direction hereinafter), passes through the bidirectional interfaces 6 of the terminals 2-(*n*−1), ..., 2-2 and 2-1 in this order, and then arrives at the transmitter/receiver IC in the host 1**.

When the return signal passes through the terminals **2-(*n*−1), ..., 2-2, 2-1, each terminal transmits data to be sent to the host 1 in synchronization with the return signal. For the data transmission from the terminals to the host 1, there are two modes that can be selected based on the command. In one mode, one terminal specified by the host 1 transmits n-bit word data to the host 1 in synchronization with the return signal. If the host 1** specifies all the terminals, in the other mode, each terminal transmits data at the bit position previously assigned to the terminal in the n-bit word data.

Figure 2A:
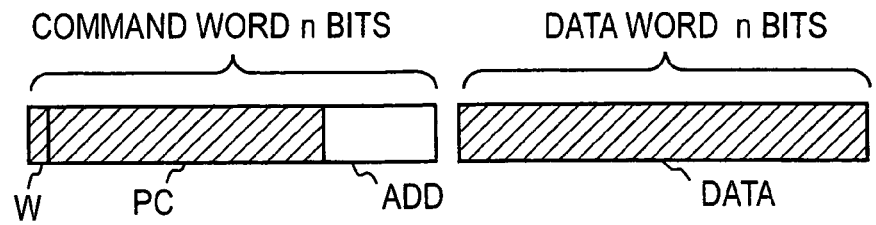
FIG. 2A shows an example of a command word and a data word in a write mode.

FIG. 2A shows an example of a parallel n-bit command word and a parallel n-bit data word. The command word comprises one bit that indicates whether the host 1 is in the data read mode in which the host 1 reads data from the terminals or data write mode in which the host 1 writes data to the terminals (R/W), a code PC of (n−1−k bits) that indicates the kind of the following processing, and an address ADD (k bits) of a specified terminal. In the drawing, the hatched areas mean that the data of the areas have been specified. FIG. 2A shows a case in which the host 1 is in the write mode, the address ADD is not specified (that is, all "0"), and the data word DATA following the command word is written to all the terminals. The kind of processing PC may be installation of data into the terminals as initial values required to activate the terminals, for example.

Figure 2B:
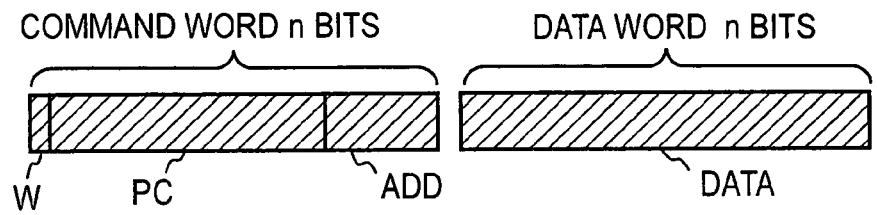
FIG. 2B shows another example of the command word and the data word in the write mode.

FIG. 2B shows an example of the command word and the data word in the case where the host 1 in the write mode writes data word to one terminal specified by the address ADD in the command word.

Figure 2C:
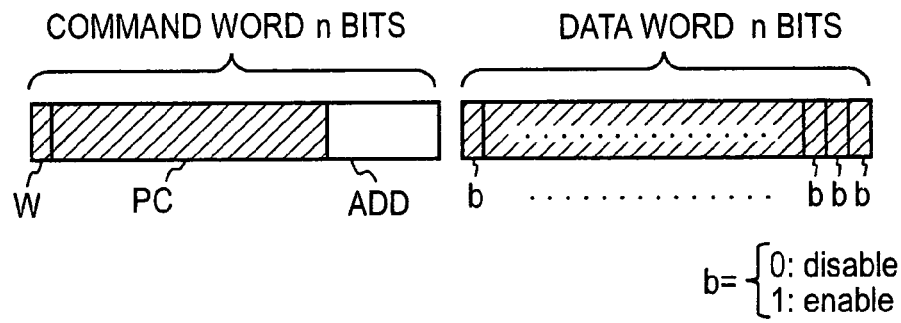
FIG. 2C shows another example of the command word and the data word in the write mode.

FIG. 2C shows an example of the command word and the data word in the case where the host 1 is in the write mode, and each terminal is set in the enabled state or disabled state. The address ADD in the command word is not specified, and a bit position in the n-bit word data DATA is assigned to each terminal. If the bit b at a bit position is "0", the corresponding terminal is set in the disabled state. If the bit b at a bit position is "1", the corresponding terminals is set in the enabled state.

Figure 2D:
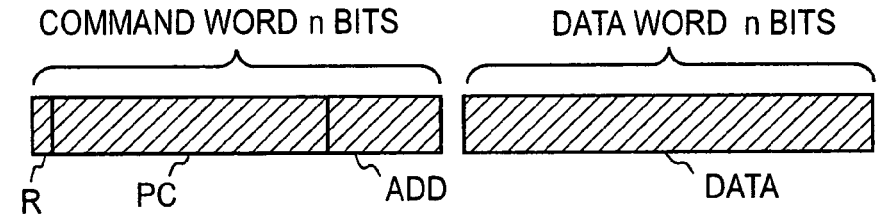
FIG. 2D shows an example of the command word and the data word in a read mode.

FIG. 2D shows an example of the command word in the case where the host 1 is in the read mode for reading data from a terminal and an example of the data word transmitted from the terminal to the host. In the case shown in FIG. 2D, one terminal specified by the address ADD in the command word is requested to transmit data, and the specified terminal transmits n-bit word data DATA to the host.

Figure 2E:
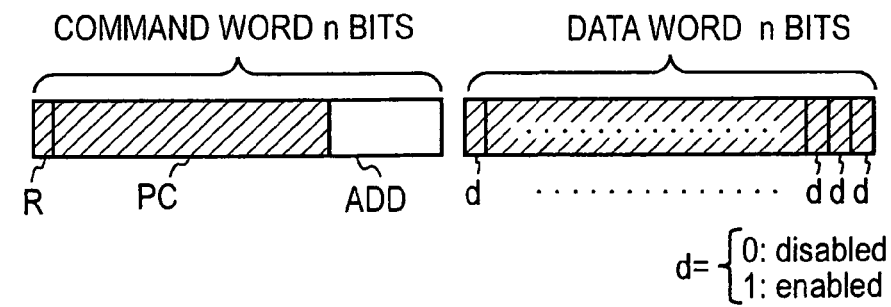
FIG. 2E shows another example of the command word and the data word in the read mode.

FIG. 2E shows an example of the command word in the case where the host 1 is in the read mode, and the host 1 requests all the terminals to transmits the terminal status, such as the status of a return signal generator section 19 described later with reference to FIGS. 3 and 4, and an example of the n-bit data word, each of the bits of which is transmitted from a different one of the terminals. The address ADD in the command word is not specified. According to the command, each terminal transmits 1-bit data d indicating the status thereof at the bit position in the n-bit word assigned to the terminal. For example, a status bit d of "0" indicates that the return signal generator section 19 is in the disabled state, and a status bit d of "1" indicates that the return signal generator section 19 is in the enabled state.

Figure 3:
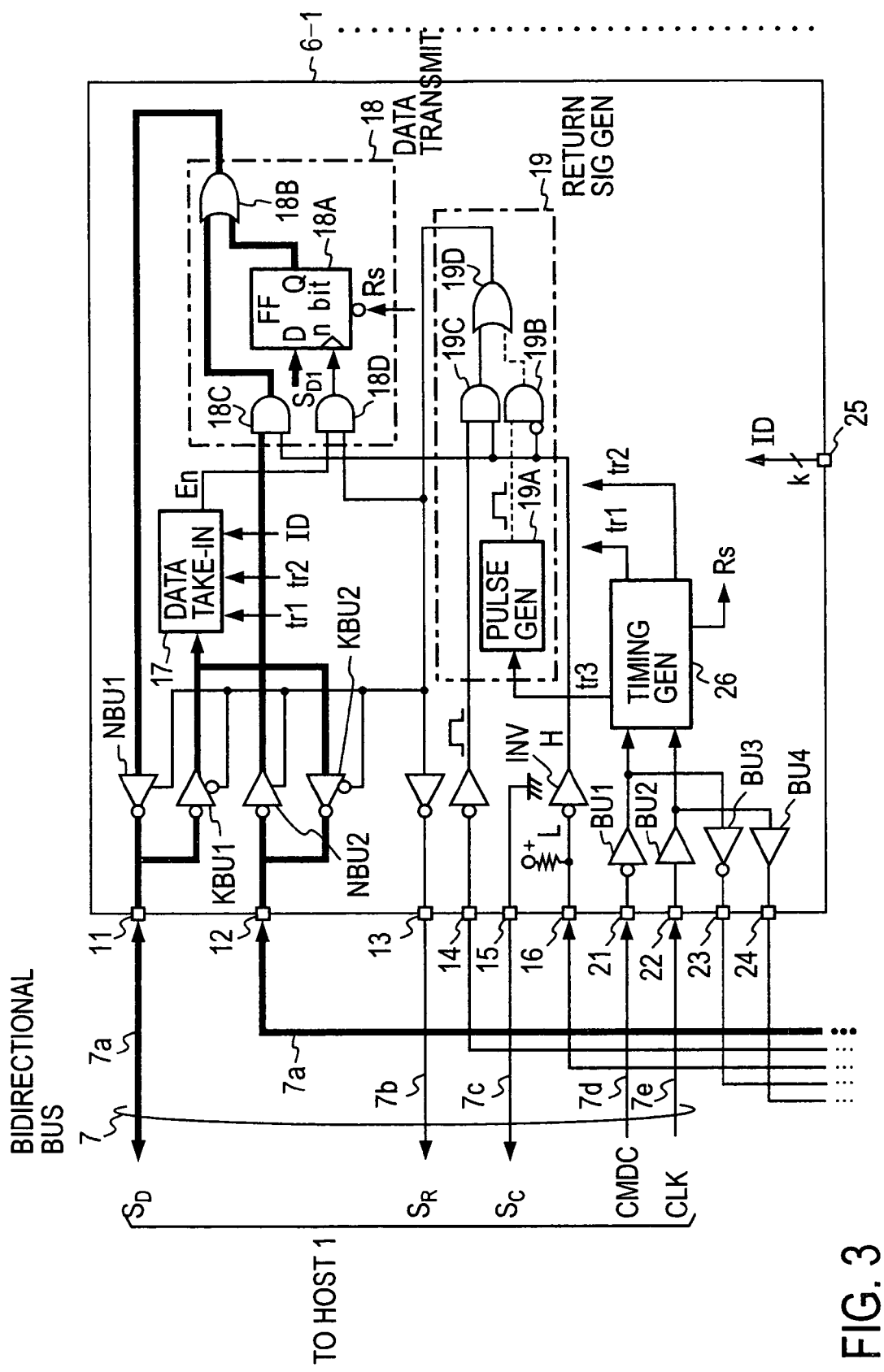
FIG. 3 is a block diagram showing a configuration of a bidirectional interface used in a terminal adjacent to a host according to the data transmission method according to the present invention.
Figure 4:
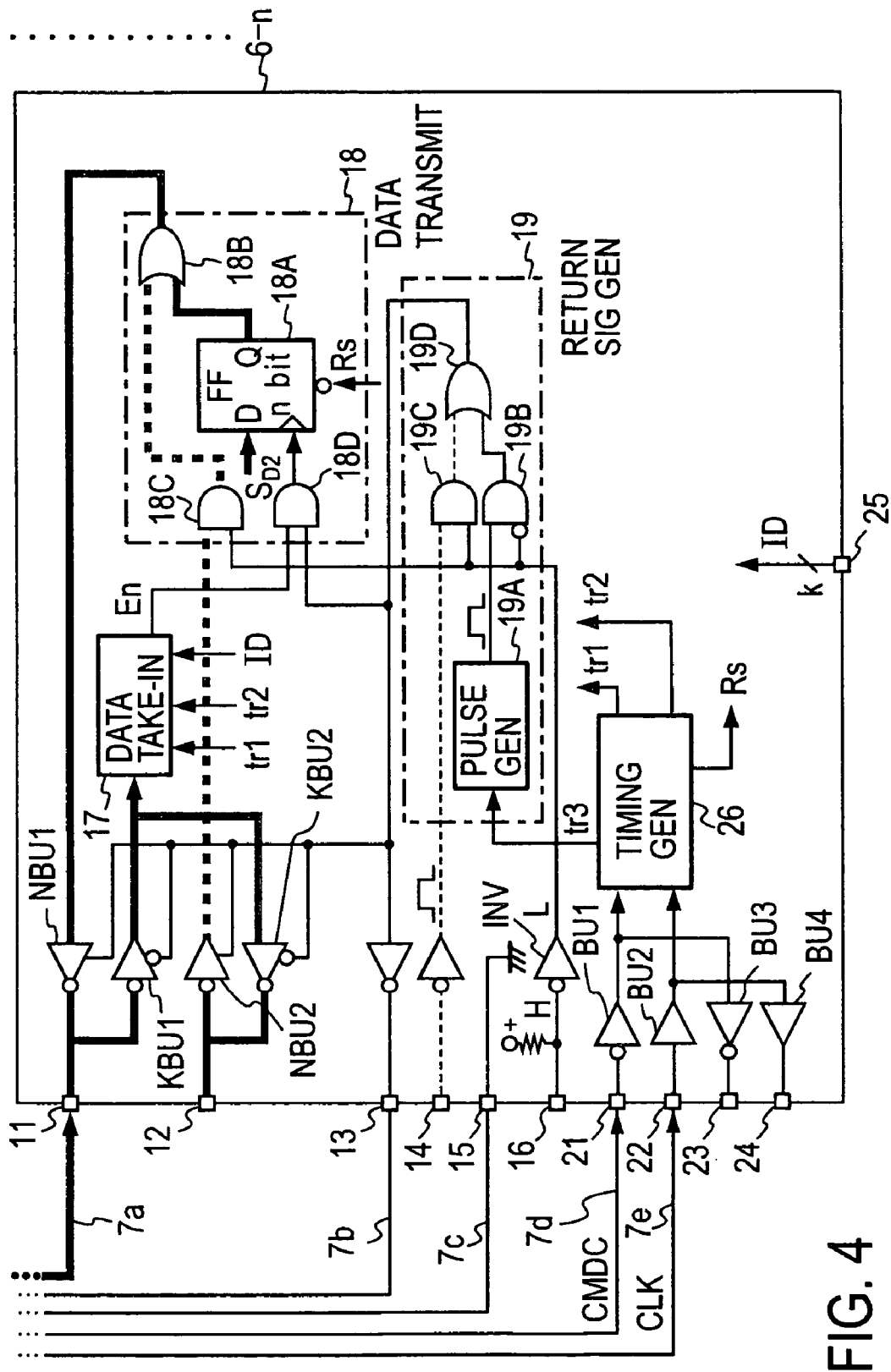
FIG. 4 is a block diagram showing a configuration of a bidirectional interface used in a terminal located at a distal end.

FIGS. 3 and 4 show a configuration of interfaces 6-1 and 6-n of bidirectional interfaces 6-1, 6-2, . . . , 6-n of the terminals 2-1, 2-2, . . . , 2-n. According to this embodiment, the interfaces are general-purpose ones in order that the interfaces having the same configuration can be used in all the terminals. The interface 6-1 shown in FIG. 3 is a bidirectional interface provided in the terminal 2-1 connected to the bidirectional bus 7 at the position closest to the host 1, and the interface 6-n shown in FIG. 4 is a bidirectional interface provided in the terminal 2-n connected to the bidirectional bus 7 at the distal end thereof. The bidirectional bus 7 comprises a parallel n-bit bidirectional data bus 7a, a return signal line 7b, a control signal line 7c, a command control line 7d and a clock line 7e.

Each bidirectional interface 6-1, 6-2, . . . , 6-n has data bus connection ports 11 and 12 connected to the bidirectional data bus 7a. The data bus connection port 11 is connected to the data bus 7a on the upward side (host side) of each terminal. The data bus connection port 12 is connected to the data bus 7a extending toward the following terminal located on the downward side thereof. Thus, at the bidirectional interface 6-n located at the distal end, the bidirectional data bus 7a is connected only to the data bus connection port 11, and the data bus connection port 12 intended for connection to the following terminal is open.

In the following, the bidirectional interface 6-1 shown in FIG. 3 will be described. The output port of an upward buffer NBU1 and the input port of a downward buffer KBU1 are connected to the data bus connection port 11, which is connected to the data bus 7a on the host side. The input port of the upward buffer NBU1 is connected to a data transmitter section 18, and the data transmitter section 18 transmits data $S_D$ in synchronization with arrival of a return signal $S_R$.

A data take-in section 17 and the input port of a downward buffer KBU2 are connected to the output port of the downward buffer KBU1. The data take-in section 17, which has a capability of taking in data transmitted from the host 1 to the terminal, takes in data addressed to the terminal and passes the data to a data processing section (not shown in FIG. 3) in the terminal. The output port of the downward buffer KBU2 is connected to the data bus connection port 12 to transmit the data $S_D$ received from the host 1 to the following terminal.

The data bus connection port 12 is connected to the input port of an upward buffer NBU2, so that data transmitted from the following bidirectional interfaces 2-n located toward the distal end of the bidirectional bus 7 is transmitted to the data bus connection port 11 via the data transmitter section 18. When the return signal generator section 19 described later outputs the return signal $S_R$, the upward buffers NBU1 and NBU2 are set in the enabled state, and the downward buffers KBU1 and KBU2 are set in the disabled state. When no return signal is output, the upward buffers NB1 and NB2 are set in the disabled state, and the downward buffers KBU1 and KBU2 are set in the enabled state.

Figure 5:
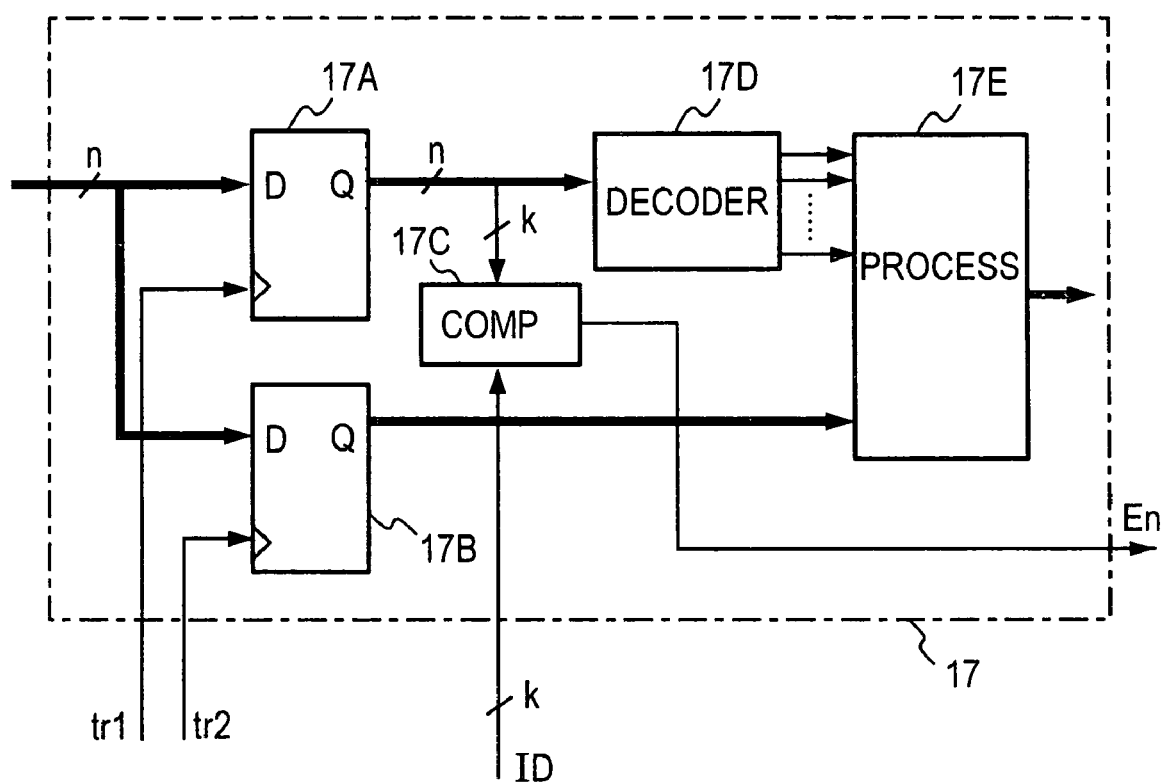
FIG. 5 is a block diagram showing an example of a configuration of a data take-in section 17.

FIG. 5 shows an example of configuration of the data take-in section 17 in the bidirectional interface of one terminal. The data take-in section 17 comprises latches 17A and 17B, a comparator section 17C, a decoder section 17D and a processing section 17E. The latch 17A takes in an n-bit command word from the bidirectional data bus 7a via the buffer KBU1 in response to a trigger tr1, and the latch 17B takes in an n-bit data word delayed one clock from the n-bit command word from the bidirectional data bus 7a via the buffer KBU1 in response to a trigger tr2 delayed one clock from the trigger tr1. The comparator section 17C receives a k-bit identification code ID that identifies the terminal to which the interface board is attached from the terminal via a port 25.

The comparator section 17C outputs and transmits an enable signal En to the data transmitter section 18 only when the k-bit address ADD in the command word taken in by the latch 17A coincides with the identification code ID of the terminal or when the k bits of the address ADD are all "0". The command word is decoded by the decoder section 17D, and the decoded command word indicates the kind of processing to be performed to the processing section 17E. The processing section 17E performs the specified processing on the data word held in the latch 17B. In the case where the host 1 is in the read mode, no data word is transmitted from the host 1, so that the terminal prepares transmission data $S_{D1}$, holds the transmission data in the data holding section 18A in the data transmitter section 18, and waits for reception of the return signal $S_R$ from the following terminal.

The data transmitter section 18 comprises the data holding section 18A, an OR gate 18B, and gates 18C and 18D. The data holding section 18A is supplied with the transmission data $S_{D1}$ specified by the processing section 17E shown in FIG. 5. The gate 18C is normally-opened, and if a following terminal transmits data $S_D$ to the host 1, the data is directly transmitted to the data bus 7a through the gate 18B. Or, if the terminal is specified by the host 1 and requested to transmit data, the gate 18D is opened by the enable signal En from the data take-in section 17, and when the return signal SR is received from the following terminal, the data holding section 18A is triggered via the gate 18D, the transmission data $S_D$ held in the holding section 18A is output to the data bus 7a.

In addition, each bidirectional interface 6-1, 6-2, . . . , 6-n has a return signal output port 13, a return signal input port 14, a control signal output port 15, a control signal input port 16, a command control input port 21, a clock input port 22, a command control output port 23, a clock output port 24, the identification code input port 25, the return signal generator section 19, and a timing generator section 26.

The command control input port 21 receives a command control signal CMDC transmitted from the host in synchronization with the transmission of the command word. The command control signal CMDC is passed to the timing generator section 26 via a buffer BU1 and, in addition, output to the command control output port 23 via a buffer BU3. The command control output port 23 is connected to the command control input port 21 of the following terminal via the command control line 7d. A clock CLK supplied from the host 1 to the clock input port 22 is supplied to the timing generator section 26 via a buffer BU2, and in addition, output to the clock output port 24 via a buffer BU4. The clock output port 24 is connected to the clock input port 22 of the following via the clock line 7e.

The return signal generator section 19 comprises a pulse generator 19A, gates 19B and 19C and an OR gate 19D. The timing generator section 26 generates the trigger tr1 that determines the timing of take-in of the command word and the trigger tr2 that determines the timing of take-in of the data word delayed one clock from the trigger tr1, based on the clock CLK and the command control signal CMDC supplied thereto. Furthermore, each time the timing generator section 26 receives the command control signal CMDC, the timing generator section 26 generates a reset signal $R_S$ for resetting the data holding section 18A in the data transmitter section 18 and generates a trigger tr3 that causes the pulse generator 19A in the return signal generator section 19 to generate a pulse as a return signal $S_R$. However, as described later, the return signal SR generated by the pulse generator 19A is blocked by the gate 19B in all the interfaces except the interface of the terminal located at the distal end.

The control signal output port 15 of each bidirectional interface 6-1, 6-2, . . . , and 6-n is connected to a common potential point and to the control signal input port 16 of the preceding bidirectional interface (located toward the host) via the control line 7c. Thus, all the bidirectional interfaces 6-1, 6-2, . . . except the bidirectional interface 6-n located at the distal end have their respective control signal input ports 16 connected to the common potential via the control signal output ports 15 of the respective following bidirectional interfaces, thereby keeping the return signal generator sections 19 in the disabled state.

On the other hand, the control signal input port 16 of the bidirectional interface 6-n connected to the data bus 7 at the distal end thereof is open, so that the return signal generator section 19 is kept in the enabled state. In summary, although the bidirectional interfaces of all the terminals have the same configuration, in the interfaces except the bidirectional interface 6-n located at the distal end, the return signal generator section 19 serves only as a through path for the return signal $S_R$ in FIG. 3. According to the present invention, it is essential only that the bidirectional interface 6-n located at the distal end can generate a return signal.

The pulse generator 19A receives the trigger signal and generates a pulse having a predetermined pulse width, when the data transmitted from the host 1 arrives at each bidirectional interface 6-1, 6-2, . . . , 6-n via the bidirectional data bus 7a. The gates 19B and 19C are opened or closed under the control of the control signal input to the control signal input port 16. Specifically, since the potential of the control signal input port 16 of the interface 6-n located at the distal end is logic "H", the gate 19B is open, and the gate 19C is closed. Consequently, if the pulse generator 19A generates a pulse, the pulse is output as the return signal SR to the return signal output port 13 via the gate 19B and the OR gate 19D.

On the other hand, in the other bidirectional interfaces 6-1, 6-2, . . . , since the control signal input port 16 is connected to the common potential, the gate 19B is closed, and the gate 19C is open. Thus, even if the pulse generator 19A generates a pulse in these interfaces, the pulse does not pass through the gate 19B and therefore is prevented from being transmitted to the outside. Thus, only the bidirectional interface 6-n located at the distal end transmits the return signal $S_R$.

The return signal $S_R$ output from the return signal output port 13 of the bidirectional interface 6-n is input to the return signal input port 14 of the preceding bidirectional interface via the return signal line 7b. The return signal $S_R$ input to the return signal input port 14 is input to the gate 19C of the return signal generator section 19. The gate 19C is open because the logic "L", which means the common potential, input to the control signal input port 16 is inverted by an inverter INV and then supplied to the gate 19C. Therefore, the return signal $S_R$ from the interface at the distal end passes through the gate 19C and is transmitted to the preceding bidirectional interface and so on.

Since the gate 18C of the data transmitter section 18 is also open, when the return signal $S_R$ passes through each bidirectional interface, the data held in the data holding section 18A is transmitted onto the bidirectional data bus 7a via the OR gate 18B and arrives at the host 1.

From the above description, it will be appreciated that the host 1 transmits data to each terminal via the bidirectional data bus 7a, and that each terminal transmits data back to the host 1. In addition, according to the present invention, in order to add a new terminal 2-i' between adjacent terminals 2-(i−1) and 2-i, the bidirectional bus cables connecting the interfaces 6-(i−1) and 6-i to each other can be released from the ports 11, 13, 15, 21 and 22 of the interfaces 6-i, and the released ends of the bidirectional bus cables can be connected to the ports 11, 13, 15, 21 and 22 of an interface 6-1' of the terminal 2-i' to be added, and the ports 12, 14, 16, 23 and 24 of the interface 6-i' of the terminal 2-i' can be connected to the ports 11, 13, 15, 21 and 22 of the interface 6-i of the terminal 2-i via additional bidirectional bus cables. Furthermore, it will be appreciated that a terminal can be easily added at the distal end of the bidirectional bus 7 by connecting the ports 12, 14, 16, 23 and 24 of the terminal currently located at the distal end to the ports 11, 13, 15, 21 and 22 of the terminal to be added via additional bidirectional bus cables.

In the following, there will be described a mechanism for the clock generated by the host 1 to allow data transmitted from each terminal and arriving at the host 1 to be read without error.

Figure 6:
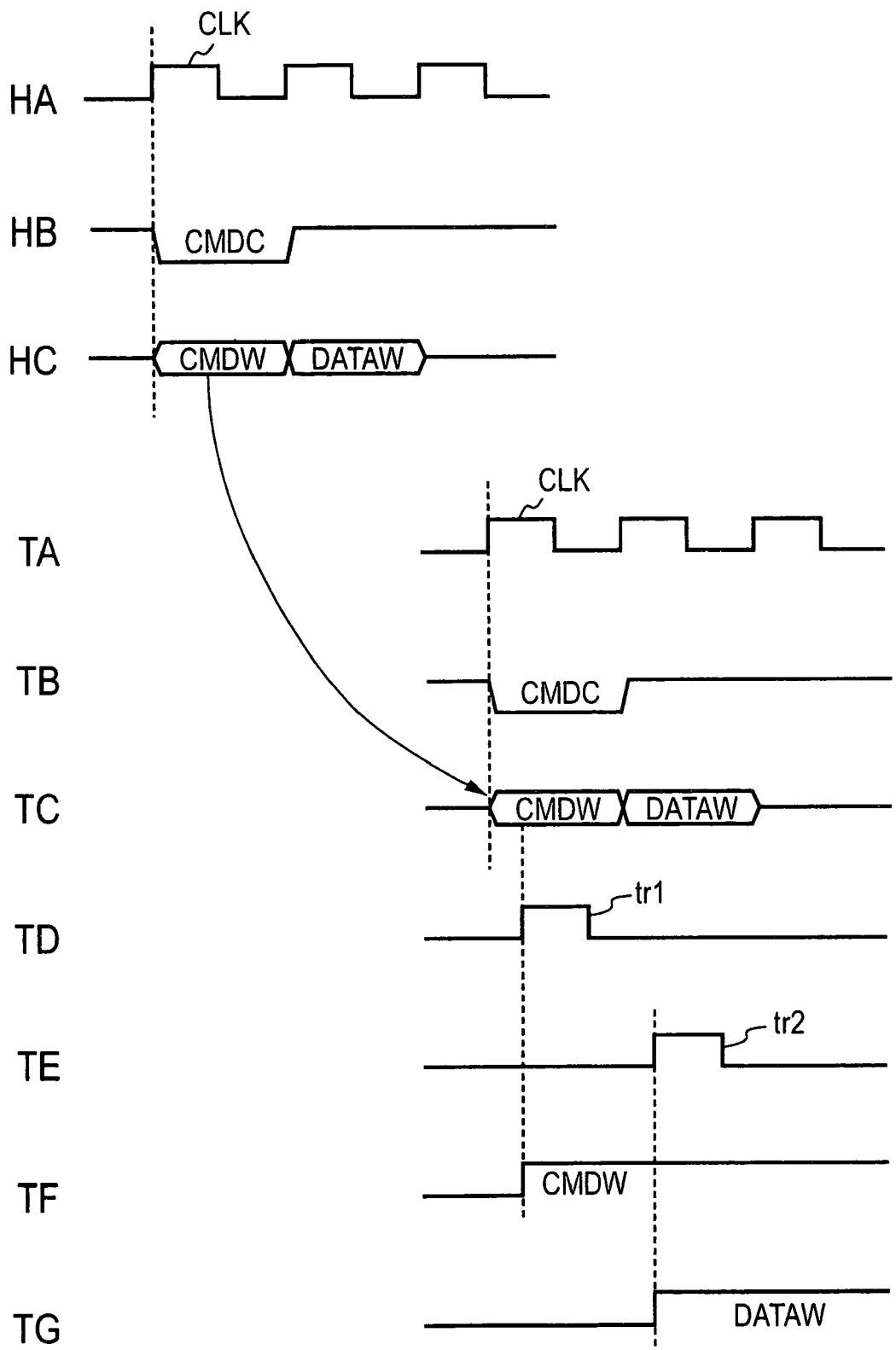
FIG. 6 is a time chart for illustrating an example of operations in the write mode.

FIG. 6 is a diagram for illustrating operations in the case where the host in the write mode writes data to a terminal as described above with reference to FIG. 2B. Rows HA, HB and HC represent operations of the host 1, and rows TA to TG represent operations of the interface of one terminal specified by the address in the command word CMDW.

In synchronization with the clock CLK (row HA), the host 1 outputs the command control signal CMDC (row TB), the command word CMDW and the data word DATAW (row HC). The specified terminal receives the clock CLK (row HA), the command control signal CMDC (row TB), the command word CMDW and the data word (row TC), takes in the command word CMDW (row TF) in response to the trigger tr1 (row TD), and takes in the data word DATAW (row TG) in response to the next trigger tr2 (row TE).

Figure 7:
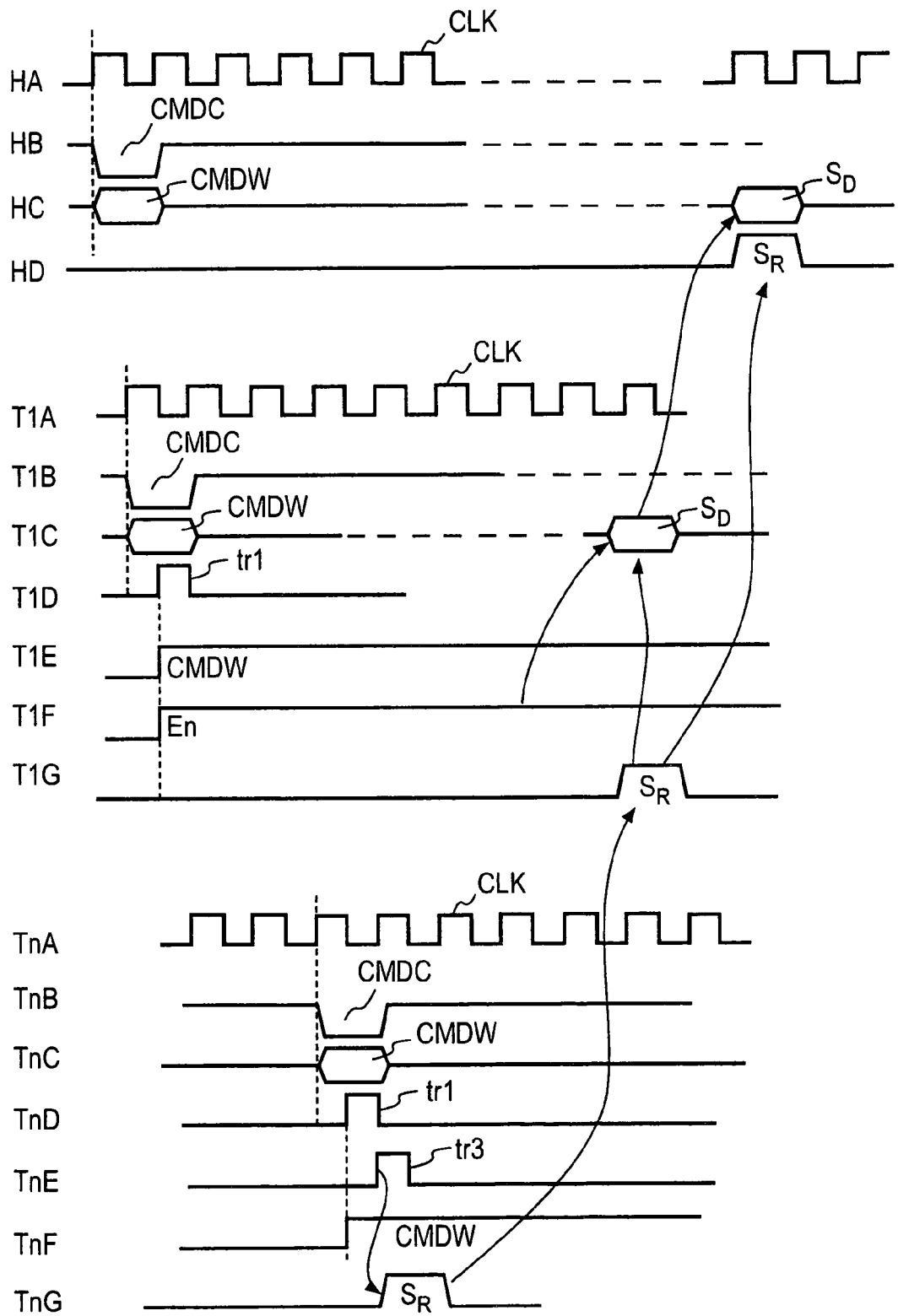
FIG. 7 is a time chart for illustrating an example of operations in the read mode.

FIG. 7 is a diagram for illustrating operations in the case where the host is in the read mode and reads data from the terminal 6-1 as described above with reference to FIG. 2D. Rows HA to HD represent operations of the host, and rows T1A to T1G represent operations of the interface of the terminal 2-1, and rows TnA to TnG represent operations of the interface of the terminal 2-n located at the distal end.

In synchronization with the clock CLK (row HA), the host transmits the command control signal CMDC (row HB) and the command word CMDW (row HC) to the terminal. The terminal 2-1 receives the command control signal CMDC (row T1B) and the command word CMDW (row T1C) in synchronization with the clock CLK (row T1A) and takes in the command word CMDW (row T1E) in response to the trigger tr1 (row T1D). If the address in the command word CMDW coincides with the identification code ID of the terminal, the data take-in section 17 generates the enable signal En (row T1F), and the data transmitter section 18 is kept in the enabled state.

The interface of the terminal 2-n located at the distal end receives the clock CLK (row TnA), and the command control signal CMDC (row TnB) and the command word CMDW (row TnC) in synchronization with the clock CLK and takes in the command word CMDW (row TnF) in response to the trigger tr1 (row TnD). In addition, the trigger tr3 (row TnE) is supplied to the pulse generator 19A to make the pulse generator 19A generate the return signal $S_R$, and the return signal is transmitted in the upward direction (row TnG).

When the terminal 2-1 receives the return signal $S_R$ (row T1G), the terminal 2-1 transmits the transmission data word $S_D$ (row T1C) to the host.

The host 1 receives the return signal $S_R$ (row HD) and the data word $S_D$ (row HC) and takes in the data word $S_D$.

Figure 8:
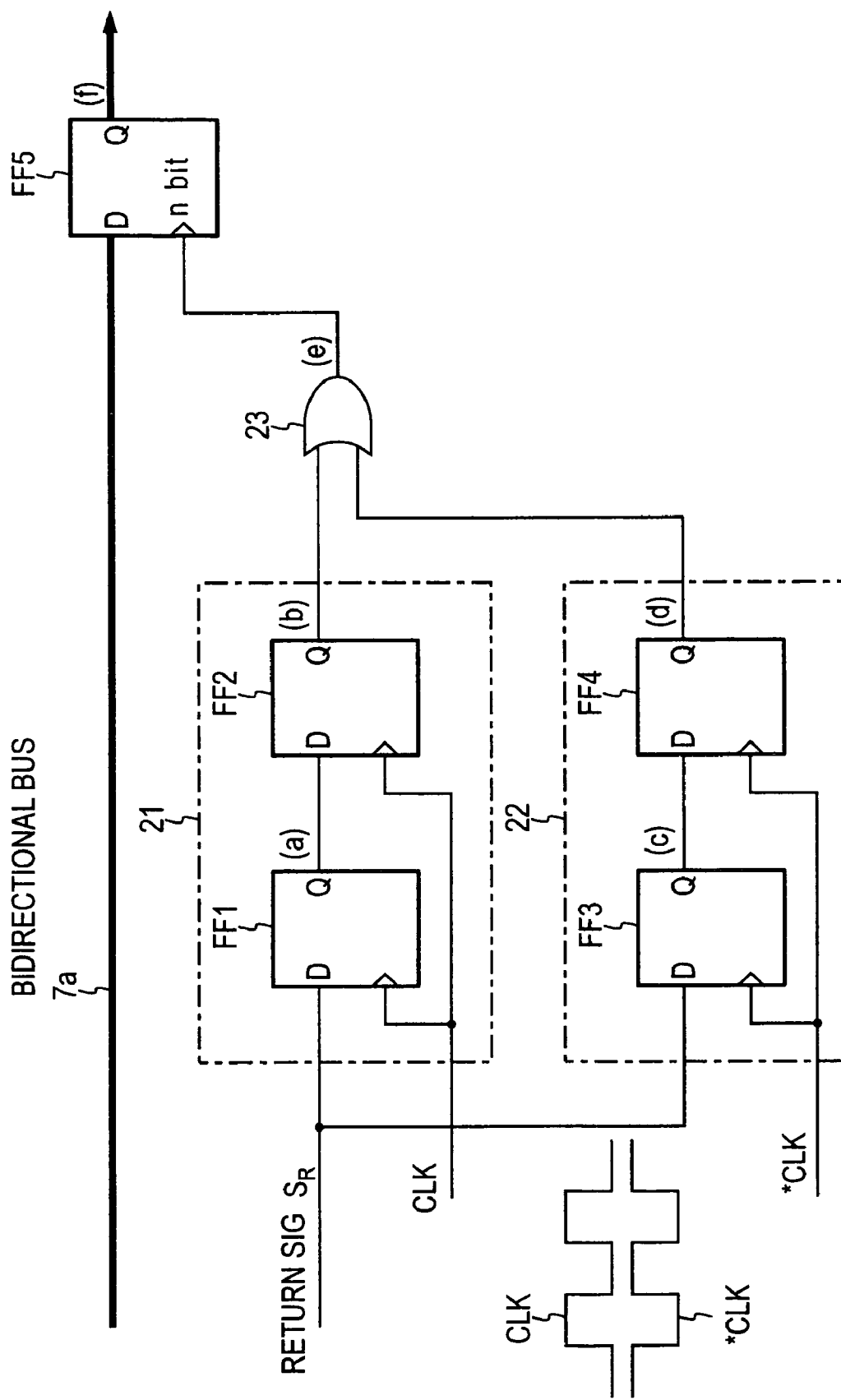
FIG. 8 is a block diagram for illustrating an example of a data read circuit capable of correctly reading data in the data transmission method according to the present invention.

FIG. 8 shows an example of a data read circuit provided in the host 1. The data read circuit comprises two cascade circuits 21 and 22 each having two flip-flops cascaded to each other, and an OR grate 23. A positive-phase clock CLK is input to a clock input port of each flip-flop FF1, FF2 of the cascade circuit 21, an opposite-phase clock *CLK is input to a clock input port of each flip-flop FF3, FF4 of the other cascade circuit 22. A flip-flop FF5 is a data-latching flip-flop provided on the bidirectional data bus 7a. The return signal is input to a data input port D of each of the preceding flip-flops FF1 and FF3 in the cascade circuits 21 and 22.

Since the data read circuit is thus configured, the data transmitted thereto via the bidirectional data bus 7a can be read in by the data-latching flip-flop FF5 without fail. In the example described above, the host writes or reads one data word each time the host transmits one command word. However, a plurality of data words can be written or read by transmitting a plurality of command words and repeating the procedure described above. Of course, various modifications are possible, and transmitting one command may allow a specified number of data words to be written or read, depending on the content of the command.

Figure 9:
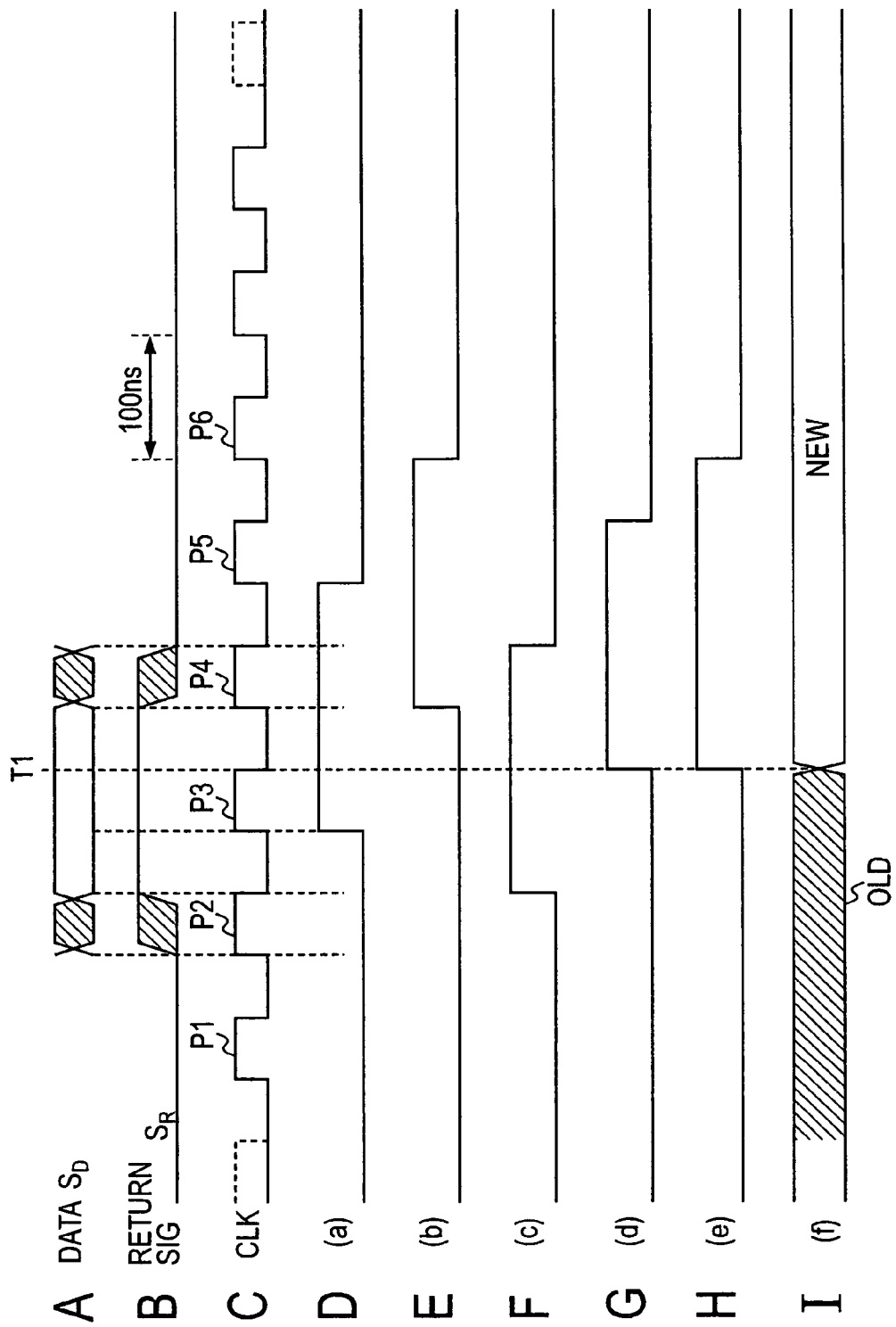
FIG. 9 is a timing chart for illustrating operations of the data read circuit shown in FIG. 8.
Figure 10:
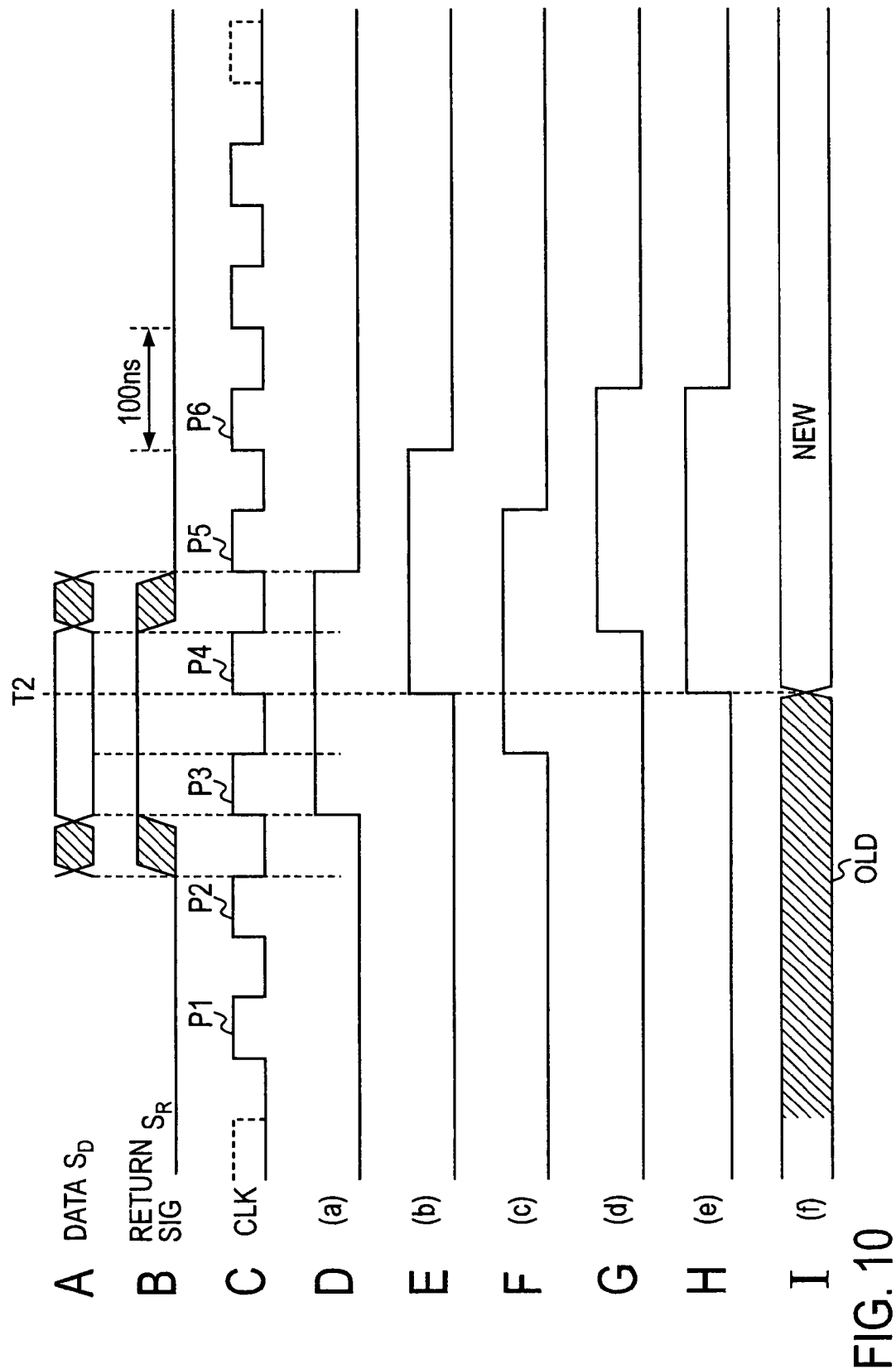
FIG. 10 is a timing chart for illustrating another example of operations of the data read circuit shown in FIG. 8.

This is shown in FIGS. 9 and 10. FIG. 9 shows operations in the case where an edge indicative of data read occurs first in the cascade circuit 22 that operates based on the opposite-phase clock *CLK. Here, the period of the clock CLK is a half of the period of the clock CLK described above with reference to FIGS. 3 and 4. FIG. 9A shows incoming data transmitted via the bidirectional data bus 7a (only one word of parallel n-bit data is shown in this drawing), and FIG. 9B shows a return signal $S_R$. The data and the return signal are delayed by the bidirectional data bus 7a and the return signal line 7b, and the phases of the leading edge and the trailing edge thereof vary as shown by the shaded areas.

The flip-flop FF1 reads the logic of the return signal at the timing of rising of a clock P3 of the positive-phase clock CLK and outputs the logic H at the output thereof (FIG. 9D). The following flip-flop FF2 reads the logic H output from the flip-flop FF1 at the timing of rising of a clock P4 and outputs the logic H at the output thereof (FIG. 9E).

On the other hand, the flip-flop FF3, which operates based on the opposite-phase clock *CLK, reads the logic of the return signal at the timing of falling of a clock P2 (which is the timing of rising for the opposite-phase clock *CLK) (FIG. 9F). In addition, the following flip-flop FF4 reads the output of the flip-flop FF3 at the timing of falling of the clock P3 and outputs the logic H at the output thereof (FIG. 9G). Furthermore, the output logic H is applied to a clock input port of the data-latching flip-flop FF5 through the OR gate 23 (FIG. 9H).

The output of the flip-flop FF4 rises to the logic H at a timing T1, which precedes the rising of the flip-flop FF2 that operates based on the positive-phase clock, and the data latching flip-flop FF5 can read data at this timing T1, so that the data-latching flip-flop takes in and output new data (NEW) at the timing T1 (FIG. 9I).

FIG. 10 shows a case where the cascade circuit 21 that operates based on the positive-phase clock CLK first detects the arrival of a return signal. In this case, the flip-flop FF1 reads in the logic of the return signal at the timing of rising of the pulse P3 of the positive clock CLK. Once the flip-flop FF1 reads the logic H, the following flip-flop FF2 reads in the logic H output from the following one at the timing of rising of the following clock P4 (FIG. 10E).

On the other hand, the flip-flop FF3 that operates based on the opposite-phase clock *CLK reads in the logic of the return signal at the timing of falling of the clock P3 (FIG. 10F). In addition, the following flip-flop FF4 reads in the logic H output from the preceding flip-flop FF3 at the timing of falling of the clock P4 (FIG. 10F). The timing of rising of the flip-flop FF4 is delayed from the timing of rising of the flip-flop FF2.

Thus, as a result, the data-latching flip-flop FF5 can read in data at the timing T2 of rising of the clock P4 and latches new data (NEW) at this timing T2 (FIG. 10I).

As described above, the terminal 2-n at the distal end transmits a return signal, and each of the other terminals transmits data in synchronization with the return signal when the return signal passes through the terminal, thereby allowing each terminal to deliver data to the host 1. Furthermore, if an address that indicates the destination terminal of data is added to the data, the data can be delivered to any terminal, even if the terminal is located upward.

What is claimed is:

1. In a serial transmission system in which interfaces of a plurality of terminals are connected in series to a data bus line connected to a host, a terminal of said plurality of terminals which is located at the farthest position from said host has a return signal generator section, and data transmitted from the host to each terminal or from each terminal to the host is transmitted through the interfaces, a data transmission method comprising:
   (a) a step of said return signal generator section transmitting a return signal at a timing when data transmitted from said host to the terminals arrives at the terminal located at the farthest position; and
   (b) a step of returning the return signal to said host passing successively through the interfaces of the terminals connected to said data bus and a specified terminal transmitting data to be transmitted to said host in synchronization with said return signal.

2. The data transmission method according to claim 1, wherein the data transmitted to the host in synchronization with said return signal is transmitted from only one terminal that is specified by said host.

3. The data transmission method according to claim 1, wherein the data transmitted to the host in synchronization with said return signal is transmitted from each terminal at a bit position assigned to the terminal.

4. A data transmission system, comprising:
   a host computer;
   a data bus line drawn from the host computer;
   a plurality of terminals having interfaces connected in series to the data bus line;
   a return signal generator section provided in each terminal;
   a control signal input port that is provided in the interface of each terminal and receives a potential signal supplied from the terminal located next thereto and downward therefrom on said data bus line viewed from said host computer for controlling said return signal generator section to be in a disabled state;
   a data take-in section that is provided in each terminal and takes in data addressed to the terminal; and
   a data transmitter section that is provided in each terminal, detects the return signal transmitted from said return signal generator section of the terminal located at the farthest position on said data bus line and transmits data to be transmitted from the terminal to another terminal or the host in synchronization with the return signal.

5. The data transmission system according to claim 4, wherein all the terminals have said return signal generator section, and the return signal generator section provided in each terminal is controlled to be kept in the disabled state by the potential signal supplied from the terminal located next to the terminal and downward from the terminal on said data bus line viewed from said host.

* * * * *